United States Patent [19]
Schwartz

[11] Patent Number: 5,442,272
[45] Date of Patent: Aug. 15, 1995

[54] CURRENT LIMITING FOR DC ELECTRIC MOTOR START-UP

[75] Inventor: Jeffrey D. Schwartz, Loveland, Colo.

[73] Assignee: Hewlett-Packard Company, Palo Alto, Calif.

[21] Appl. No.: 146,546

[22] Filed: Nov. 2, 1993

[51] Int. Cl.⁶ .............................................. H02P 7/06
[52] U.S. Cl. ................................... 318/778; 318/782; 318/800
[58] Field of Search ............... 318/696, 685, 254, 138, 318/439, 778, 779, 780, 781, 782, 784, 799, 800, 801, 802, 811; 62/158, 230; 361/22; 417/45

[56] References Cited

U.S. PATENT DOCUMENTS

| | | | |
|---|---|---|---|
| 3,997,832 | 12/1976 | Tanaka et al. | 318/139 X |
| 4,544,868 | 10/1985 | Murty | 318/254 |
| 4,839,754 | 6/1989 | Gami et al. | 360/73.01 |
| 4,879,498 | 11/1989 | Shinohara et al. | 318/254 |
| 5,268,623 | 12/1993 | Müller | 318/434 |
| 5,327,052 | 7/1994 | Sakurai et al. | 318/254 |

FOREIGN PATENT DOCUMENTS 62-68091  3/1987  Japan .

*Primary Examiner*—William M. Shoop, Jr.
*Assistant Examiner*—Brian Sircus
*Attorney, Agent, or Firm*—Augustus W. Winfield

[57] ABSTRACT

A method for reducing motor start-up current in an electric motor control system. The method first prevents flow of current through the motor while slowly charging a parallel capacitor. Then, the motor control voltage is reduced and current is switched through the motor. The motor control voltage remains reduced until the motor starts turning. After the motor starts turning, the control voltage is slowly increased as the motor accelerates, limiting the current from the power supply.

2 Claims, 2 Drawing Sheets

CURRENT LIMITING FOR DC ELECTRIC MOTOR START-UP

FIELD OF INVENTION

This invention relates generally to control of DC electric motors and more specifically to limiting start-up current.

BACKGROUND OF THE INVENTION

Microprocessor based motor control systems are commonly used in applications such as video cassette recorder (VCR) head motors, spindle motors for computer flexible disks, spindle motors for compact disks, motors for camcorder drive capstans, and tape drive capstans for tape drives for personal computers. In each of these applications, size and weight are important design parameters. Power supplies are typically designed for relatively constant current requirements and not for high transient current capability as often required by motors during motor start-up. In each of these applications, sensitive analog electronic circuits are affected by power supply noise resulting from motor control circuitry. There is a need for limiting current during motor start-up rather than requiring large and heavy power supplies. There is a need for limiting current during motor start-up without requiring large and heavy current limiting hardware or large and heavy power supply filter hardware.

SUMMARY OF THE INVENTION

The current invention uses microprocessor motor control firmware to limit motor start-up current. There are three sequential control phases during motor start-up. During the first control phase, the motor draws no current and a filter capacitor is slowly charged. During the second phase, limited current from the power supply is used along with additional current from the filter capacitor to achieve initial motor motion. During the third phase, limited current from the power supply is used to accelerate the motor up to normal operating speed.

DETAILED DESCRIPTION OF THE PREFERRED EMBODIMENT OF THE INVENTION

Figure 1:
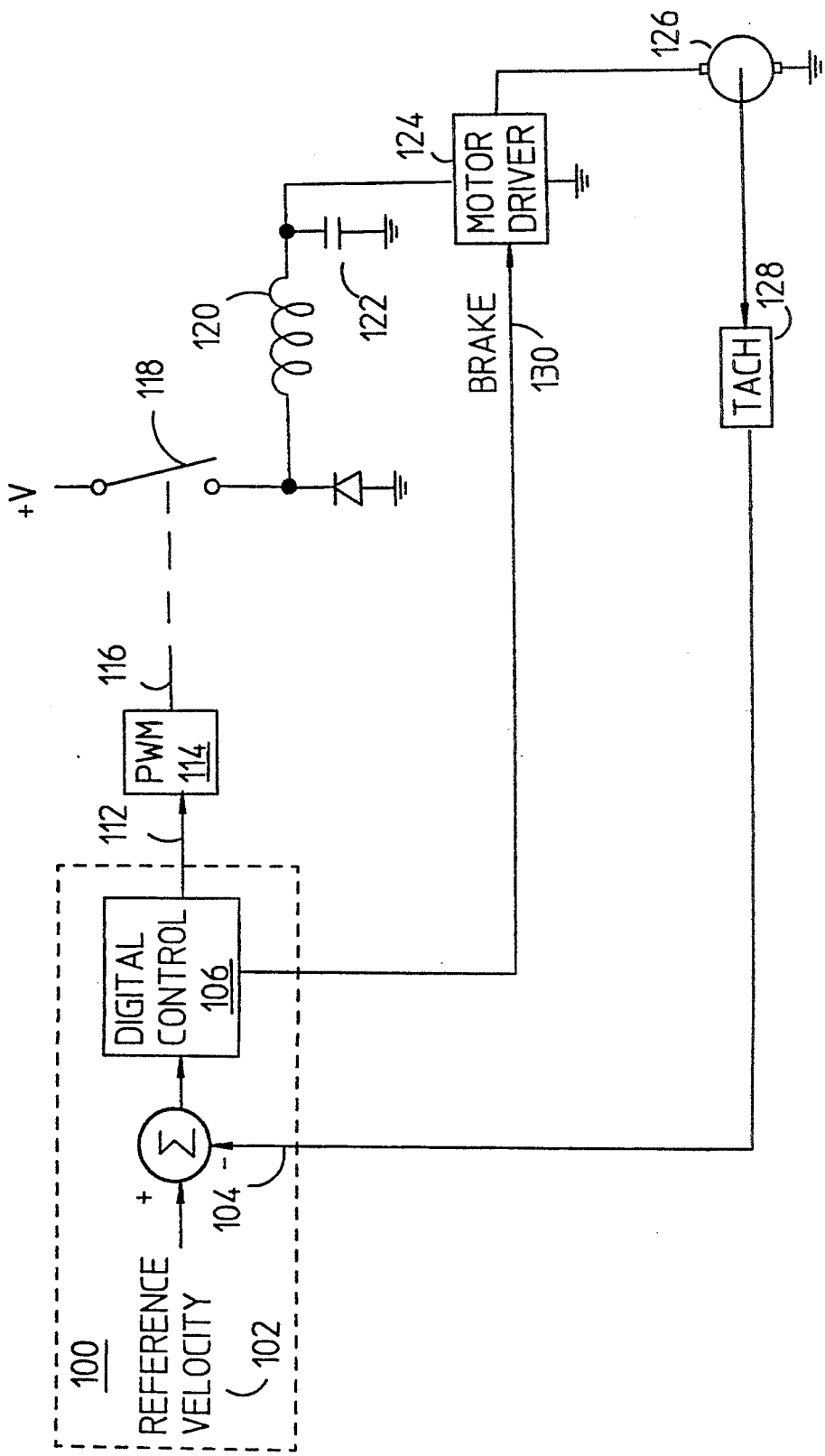
FIG. 1 is a block diagram schematic of a microprocessor based motor control circuit.

FIG. 1 illustrates a microprocessor based motor control system for a small DC electric motor. A microprocessor 100 provides a numerical value 112 that controls the period of a pulse-width-modulated digital signal 116. The pulse-width-modulated signal 116 controls a switch 118 (typically a transistor). Inductor 120 and capacitor 122 provide low pass filtering and energy storage. Motor driver 124 is a commercially available circuit for controlling direction and commutation of a DC electric motor 126. Tachometer 128 provides pulses 104 at a rate proportional to motor angular velocity for feedback to the microprocessor 100. Microprocessor 100 times the interval between tachometer pulses to determine a numerical velocity value for comparison to a reference velocity 102.

When the motor 126 is stationary, current through the motor is limited only by coil resistance. As the motor starts turning, the rapid switching of inductive motor coils creates an AC reactive impedance that reduces motor current. At any fixed motor voltage, initial motor current is high and then decreases as the motor increases in speed. The motor driver 124 also has an input labeled BRAKE 130. If BRAKE is asserted, no power is applied to the electric motor 126 and instead, the motor terminals are shorted through the motor driver 124.

Typically in a system as illustrated in FIG. 1, when power is applied, the control system attempts to immediately accelerate the motor 126 to normal operating velocity as rapidly as possible. If power is suddenly applied to the circuit illustrated in FIG. 1 and if the pulse-width-modulator 114 then provides a 100% duty cycle to switch 118 with the motor 124 stationary, the power supply must provide current to charge the capacitor 122 and also provide current to the motor 126 limited only by motor coil resistance. Specifying a power supply to provide this high initial current surge increases the size and weight of the power supply. A smaller power supply can be used if the initial surge currents can be limited.

Figure 2:
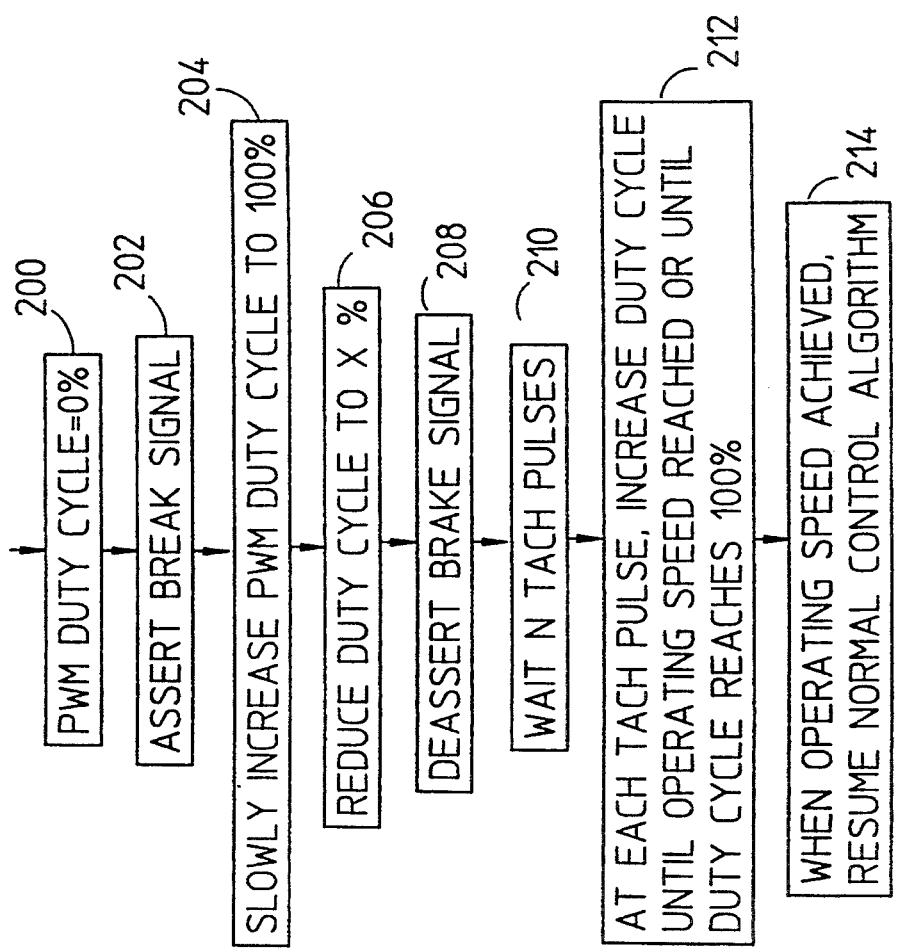
FIG. 2 is a flow chart illustrating the method of the present invention for limiting motor start-up current.

In the present invention, initial surge currents are limited by a start-up process that is a special case within the digital control firmware 106. FIG. 2 illustrates the method of the present invention for limiting the initial start-up surge current. When a stationary motor is first started, the method illustrated in FIG. 2 is used instead of a closed-loop angular velocity control algorithm. First, the pulse-width-modulator duty cycle is set to 0% and the BREAK signal is asserted (steps 200 and 202). With the BRAKE signal asserted, the motor draws no current. The pulse-width-modulator duty cycle is then slowly increased to 100% (step 204). The rate of increase of the pulse-width-modulator duty cycle is limited to a rate that ensures that the capacitor charging current (C* dV/dt) does not exceed the surge current capability of the power supply. The pulse-width-modulator duty cycle is then reduced to a predetermined percent (step 206) such that at the predetermined percent, the average voltage at the motor divided by the motor coil resistance does not exceed the surge current capability of the power supply. Then, the BRAKE signal to the motor driver is deasserted (step 130). When the BRAKE signal to the motor is deasserted, the motor draws current limited only by the resistance of the motor coils. Some of the initial motor current is provided by the capacitor 122. The stored energy in the capacitor plus the limited current from the power supply (limited voltage from the pulse-width-modulator) is sufficient to start motor motion. After a few tachometer pulses are received (step 210), the motor is starting to move with enough angular velocity to increase the motor impedance due to switching of coils. Then, as the motor accelerates and impedance increases, the pulse-width-modulator duty cycle is increased (step 212). Increasing motor voltage (increasing pulse-width-modulator duty cycle) and motor acceleration continues until a desired operating speed is achieved. At that point, velocity control is transferred to a closed-loop angular velocity control algorithm (step 214).

The effective motor impedance is directly proportional to motor angular velocity. Therefore, during the third phase (FIG. 2, step 212), the current through the motor can be precisely controlled by making the voltage applied to the motor directly proportional to motor velocity. That is, the duty cycle of the pulse-width-modulator is controlled to be inversely proportional to the time period between tachometer pulses. In systems where motor acceleration times are consistent and well characterized, simpler algorithms are adequate. For example, if the motor always accelerates to operating speed within a few revolutions of the motor, controlling the duty cycle of the pulse-width-modulator to be proportional to angular rotation may provide adequate current limitation. That is, the pulse-width-modulator is incremented by a fixed count at each tachometer pulse.

In an example embodiment of FIG. 1, the motor driver circuit 124 is a TDA5145 Brushless DC motor drive circuit from Philips Semiconductors, Marktgroep Philips Components, Postbus 90050, 5600 PB Eindhoven, Netherlands. The motor driver circuit 124 includes the generation of tachometer pulses. Each tachometer pulse 104 interrupts the processor 100. At one typical operating speed of the motor, the tachometer generates 2,020 pulses per second. The inductor 120 is 80 microHenrys. The capacitor 122 is 330 microFarads. The numerical value 112 to the pulse width modulator is an 8-bit number. The pulse width modulator 114 runs at 100,000 pulses per second. In the example embodiment, in FIG. 2, step 204, the 8 bit pulse width modulator is incremented every 11 micro-seconds so that the capacitor is charged over a period of 2.8 milliseconds. In FIG. 2, step 204, the duty cycle is reduced to 66%. In FIG. 2, step 210, the pulse-width-modulator duty cycle remains at 66% for 6 tachometer pulses. In FIG. 2, step 212, the 8 bit pulse width modulator is incremented once for each tachometer pulse. In the example embodiment, without the present invention, the power supply surge current at motor start-up is 3 A. With the present invention, the power supply surge current at motor start-up is 1.8 A. The motor start-up surge current with the 66% duty cycle is 2.2 A, with 0.4 A being provided by the capacitor and 1.8 A provided by the power supply.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a motor control circuit having a DC electric motor, a power supply for supplying current to the motor, a filter, the filter including a capacitor connected in parallel with the motor, a method for starting the motor, the method comprising the following steps:
   (a) preventing current flow through the motor;
   (b) applying a motor voltage to the motor, the motor voltage being equivalent to a maximum voltage, thereby charging the capacitor to the maximum voltage;
   (c) reducing the motor voltage being applied to the motor to an intermediate voltage, at which if the intermediate voltage is applied directly to the motor while stationary, current through the motor does not exceed a predetermined power supply current limit;
   (d) switching current flow through the motor;
   (e) measuring motor angular velocity after the motor begins rotating; and
   (f) increasing the motor voltage being applied to the motor in proportion to the motor angular velocity.

2. In a motor control circuit having a DC electric motor, a power supply for supplying current to the motor, a filter, the filter including a capacitor connected in parallel with the motor, a method for starting the motor, the method comprising the following steps:
   (a) preventing current flow through the motor;
   (b) applying a motor voltage to the motor, the motor voltage being equivalent to a maximum voltage, thereby charging the capacitor to the maximum voltage;
   (c) reducing the motor voltage being applied to the motor to an intermediate voltage, at which if the intermediate voltage is applied directly to the motor while stationary, current through the motor does not exceed a predetermined power supply current limit;
   (d) switching current flow through the motor;
   (e) measuring, after the motor begins rotating, motor angular position relative to a starting position; and
   (f) increasing the motor voltage being applied to the motor in proportion to the motor angular position.

* * * * *